Oct. 25, 1960 M. E. MITCHELL 2,957,981

PHASE SHIFT VOLTAGE COMPARATOR

Filed June 19, 1957 5 Sheets-Sheet 1

INVENTOR
M. E. MITCHELL
BY Walter M. Hill
ATTORNEY

INVENTOR
M. E. MITCHELL
BY Walter M. Hill
ATTORNEY

PHASE SHIFT VOLTAGE COMPARATOR
Filed June 19, 1957 5 Sheets-Sheet 3
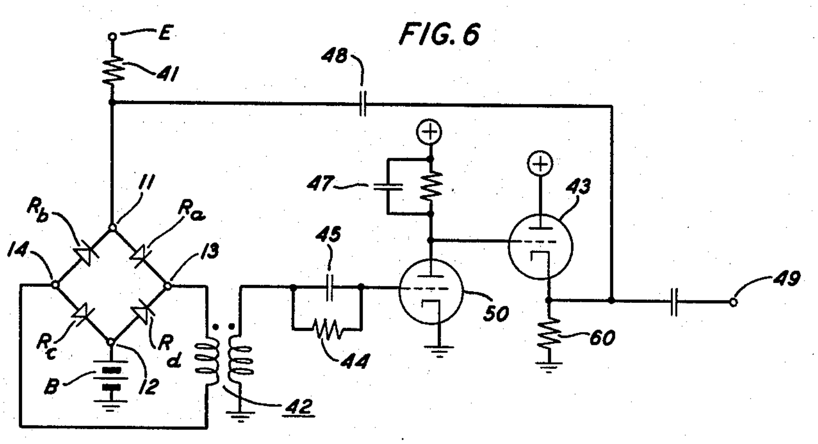
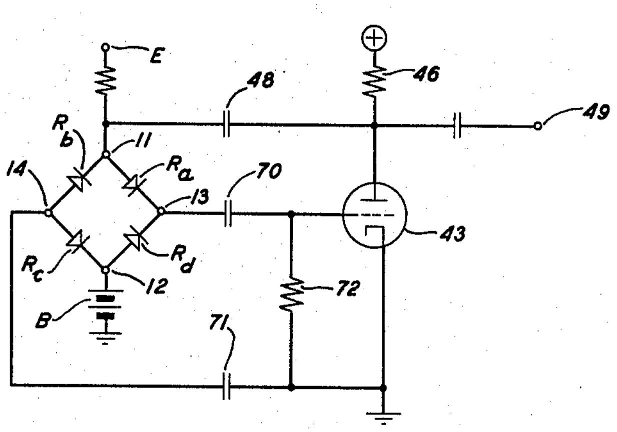
FIG. 7
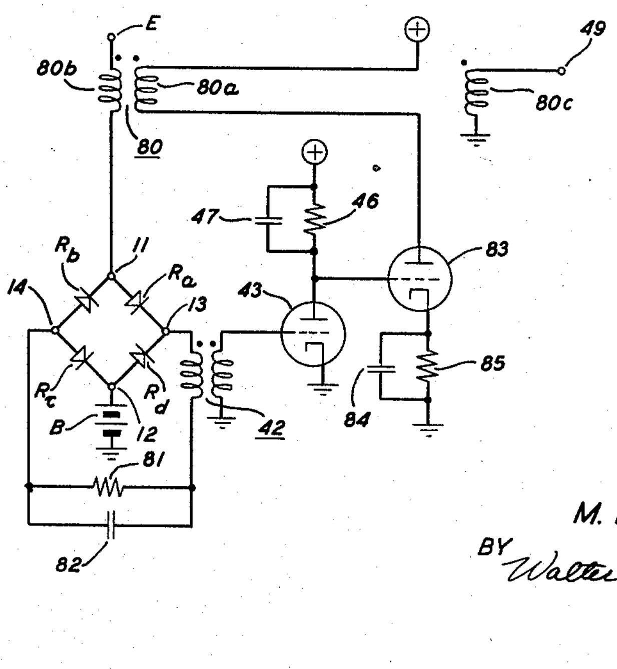
FIG. 8
INVENTOR
M. E. MITCHELL
BY Walter M. Hill
ATTORNEY Oct. 25, 1960 M. E. MITCHELL 2,957,981

PHASE SHIFT VOLTAGE COMPARATOR

Filed June 19, 1957 5 Sheets-Sheet 4

INVENTOR
M. E. MITCHELL
BY Walter M. Hill
ATTORN

INVENTOR
M. E. MITCHELL
BY Walter M. Hill
ATTORNEY

United States Patent Office 2,957,981

Patented Oct. 25, 1960

2,957,981

PHASE SHIFT VOLTAGE COMPARATOR

Michael E. Mitchell, Ithaca, N.Y., assignor to Bell Telephone Laboratories, Incorporated, New York, N.Y., a corporation of New York Filed June 19, 1957, Ser. No. 666,737

9 Claims. (Cl. 328—200)

This invention pertains to voltage amplitude comparators, and particularly to a voltage amplitude comparator having a normally degenerative feedback loop which becomes regenerative when the applied input voltage reaches a predetermined amplitude.

An amplitude comparator is an electronic circuit for indicating the precise instant at which the amplitude of an input voltage reaches a predetermined reference voltage level. Perhaps the simplest of such circuits comprises a diode connected to a high gain amplifier, the diode being biased in its reverse or nonconducting direction. If the diode operates as a theoretically perfect switch, when the signal voltage applied to it becomes equal to (or infinitesimally greater than) the bias voltage it will conduct and the amplifier will produce an output voltage. The time at which this output voltage is initiated may be sharply defined by the pulse produced by a differentiating circuit connected to the amplifier. However, the accuracy of such circuits is limited due to the fact that a diode actually changes from the fully nonconducting to the fully conducting condition in a continuous and gradual manner as the net voltage across the diode changes in a direction to initiate conduction. As a result, the instant at which the amplifier produces a detectable output voltage depends on the slope, or rate of rise, of the input voltage waveform. This slope sensitivity can be reduced by increasing the gain of the amplifier, but the accuracy of measurement will then vary with the gain. Any slight variation in the value of the latter will cause an error in the indication of the instant at which the input voltage becomes equal to the bias voltage.

To overcome the foregoing limitation, regenerative amplitude comparators have been developed which include a biased diode connected to an amplifier, as described, but wherein the output voltage of the amplifier is returned through a feedback loop to the input of the diode or the amplifier. In some cases one or more amplifier stages are connected in cascade with the initial one, the output voltage of the last stage being regeneratively returned to one of the preceding stages. A concise survey of the most common regenerative amplitude comparator circuits (blocking oscillators, monostable multivibrators, Schmitt trigger circuit, and multiar) is given in the article by M. C. Holtje entitled, "A New Circuit for Amplitude Comparison," appearing in the General Radio Experimenter, volume 30, No. 6, November 1955. That article shows that the sensitivity of such circuits cannot be further improved by increasing the amplifier gain beyond the value "two," but that by providing an additional feedback loop which is degenerative this sensitivity limitation is removed. Such an arrangement is disclosed in Patent 2,715,718, issued to M. C. Holtje on August 16, 1955. As described therein, a bridge network including a biased diode is utilized to supply opposing degenerative and regenerative feedback voltages to opposite channels of a differential amplifier. When the amplitude of the input voltage applied to the bridge equals the bias voltage the bridge becomes balanced and the feedback voltages become equal. When the input voltage increases above the bias voltage level the regenerative feedback voltage becomes predominant and the differential amplifier functions as an oscillator. By making the gain of each amplifier channel large, very high sensitivity is achieved. However, the accuracy of this circuit is dependent on the degree to which the gains of both channels of the differential amplifier are precisely equal. This condition is very difficult to maintain, particularly when large gains are used to achieve high sensitivity. A relatively slight difference in channel gains will result in a large error because the measurement depends directly on detecting the difference between two very nearly equal voltages which are amplified in the respective channels.

Accordingly, an object of the present invention is to provide a voltage amplitude comparator of improved sensitivity, accuracy, and speed to respond to input voltage waveforms having widely differing rise times ranging virtually to zero.

A further object is to provide a voltage amplitude comparator wherein the comparison of an input voltage with a reference voltage is effected by producing an abrupt and easily detected change of the operating conditions in a single feedback loop when those voltages become equal.

A still further object is to provide a voltage amplitude comparator which will indicate when an input voltage rises to a first reference voltage and when it drops to a second reference voltage, the indication of either of these events being continued until the other one occurs.

An amplitude comparator constructed in accordance with the invention comprises a bridge network included in the feedback loop of an amplifier. At least one arm of the bridge contains a voltage sensitive impedance. A bias voltage applied to the bridge holds that impedance to a value at which the transmission phase shift through the bridge renders the feedback loop degenerative. When an input voltage is applied to the bridge in a direction opposing the bias voltage, the bridge approaches balance. When the two voltages reach equality, the transmission phase shift through the bridge abruptly reverses to render the feedback loop regenerative. The amplifier is thus caused to suddenly produce a large change in its output voltage.

In one embodiment the invention comprises two feedback loops as described, each with its own bridge network, and with an amplifier connected in each loop. The first bridge is supplied with a larger bias voltage than the second bridge, the input voltage being applied to both bridges in parallel. The transmission phase shift through the first bridge renders the first feedback loop degenerative when the input voltage is less than the larger bias voltage and regenerative when the input voltage rises to the level of that voltage. Similarly, the transmission phase shift through the second bridge renders the second feedback loop degenerative when the input voltage is greater than the smaller bias voltage and regenerative when the input voltage falls to the level of that voltage. In addition, the two loops are so interconnected that the amplifier in either loop is driven to one of its two extreme operating states when one of the loops becomes regenerative. The amplifier then does not return to the opposite extreme operating state until the other loop becomes regenerative.

The invention thus provides a means for producing either of two widely different amplifier operating conditions, an abrupt change from one condition to the other occurring in response to a sharply defined complete phase reversal when the input voltage becomes equal to the selected bias voltage. The amplitude comparators of the prior art respond directly to the difference between such voltages, and as that difference is too small for accurate detection in the region of equality, applicant's invention provides a far more sensitive and accurate indication of the precise instant of voltage equality. Since only two possible operating conditions are involved in applicant's invention, the mode of amplitude comparison involved therein is digital in nature. In contrast, the prior art technique of responding to the continuously varying difference between a varying and a fixed voltage is an essentially analog measurement which is much more subject to errors.

Further objects and additional features of the invention are set forth in the following detailed specification and accompanying drawings, in which:

Figs. 4 to 8 are circuit diagrams of various amplitude comparators constructed in accordance with the invention, some being adapted to detect the instant at which the input voltage rises to a higher reference level and others when the input voltage drops to a lower reference level;

Figure 1:
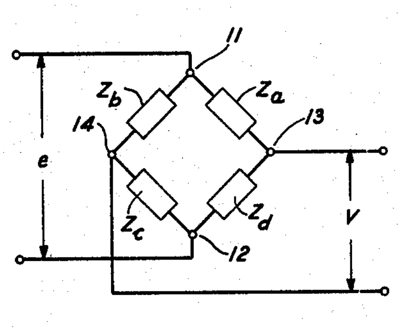
Fig. 1 is a diagram of a generalized impedance bridge network.

The generalized impedance bridge of Fig. 1 has a pair of input terminals 11 and 12, a pair of output terminals 13 and 14, and impedance arms Z*a*, Z*b*, Z*c*, and Z*d*. If all of the arms except one are of equal impedance, the bridge will be unbalanced and output voltage V will have a magnitude and phase relative to signal voltage *e* dependent on which of the arms is unequal and on the degree of the inequality. For example, assume that the impedances of arms Z*a*, Z*b*, and Z*c* are equal and that the impedance of arm Z*d* has the same phase angle as the other arms but is larger in magnitude. Then the phase of output voltage V produced between terminals 13 and 14 relative to signal voltage *e* applied between terminals 11 and 12 will always be such that the polarity of terminal 13 relative to terminal 14 is the same as the polarity of terminal 11 relative to terminal 12. As the magnitude of the impedance of arm Z*d* is reduced the magnitude of voltage V will decrease but its phase does not change until that impedance is reduced below the balance point. As the balance point is crossed, the phase of voltage V suddenly reverses. By controlling the magnitude of the impedance of arm Z*d* in accordance with the amplitude of an input voltage E, the instant at which the input voltage reaches an amplitude which makes that impedance equal to the other bridge arm impedance will be indicated by a reversal of the phase of output voltage V relative to signal voltage *e*.

Figure 2:
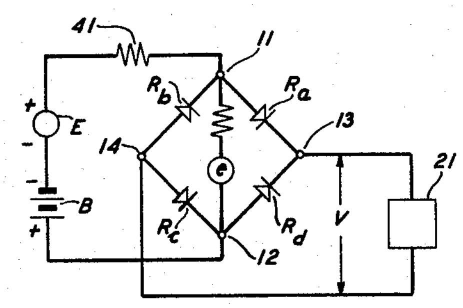
Fig. 2 is a diagram of a biased diode bridge network.

A crystal diode may serve as a voltage sensitive resistance in a resistive bridge as described. To reduce the effects of resistance variation with temperature it is preferable that the remaining arms also be crystal diodes, all diodes having matching characteristics. A diode bridge of this kind is shown in Fig. 2, and has input terminals 11 and 12 and output terminals 13 and 14 as in Fig. 1. Diodes R*a*, R*b*, R*c*, and R*d* respectively correspond to arms Z*a*, Z*b*, Z*c*, and Z*d* of the bridge in Fig. 1, diodes R*a* and R*d* being poled to conduct current toward terminal 13 and diodes R*b* and R*c* being poled to conduct current away from terminal 14. Consequently, this network forms a full wave rectifier of wh'ch input terminals 11 and 12 are the alternating current terminals and output terminals 13 and 14 are the direct current terminals. A direct input voltage E and a source of direct bias voltage B are applied in series opposed relation across input terminals 11 and 12, a coupling resistor 41 being included in the series path. A source of a signal voltage *e*, and its internal impedance, is also shown connected across input terminals 11 and 12. Physically this voltage will be due to ambient electrical noise, and so consists of a random series of positive and negative pulses of very small amplitude.

Assuming that the four diodes of Fig. 2 are identical, the bridge will be in balance when voltage E equals voltage B. Should voltage E vary slightly from that value, the noise voltage *e* is transmitted to the load and appears there as a voltage V the phase of which depends upon whether voltage E increases or decreases from the balance point. When voltage E increases, the pair of opposite arms R*a* and R*c* become conductive, thus unbalancing the bridge in one direction. When the voltage E decreases from balance, arms R*b* and R*d* become conductive and reverse the unbalance. It will thus be observed that an abrupt reversal in phase of voltage V with respect to *e* takes place as the balance point is crossed. That is, when E passes through a value equal to B the transmission phase shift through the bridge network changes by 180 degrees.

Except for noise voltage *e*, when E becomes equal to B the resistances of all diodes in the bridge network would be equal and the bridge would be in balance. Output voltage V would then be zero. Due to the noise voltage *e*, however, a small output voltage is always present, and reverses phase slightly before E becomes precisely equal to B. That is, if E is initially greater than B and is decreasing, when it reaches a value such that $E-B$ is infinitesimally less than *e* the phase of *e* relative to output voltage V when *e* is negative will shift from zero to —180 degrees. Similarly, if E is initially less than B and increases, when it reaches such that $B-E$ is infinitesimally less than *e* the phase of *e* relative to output voltage V when *e* is positive will shift from —180 degrees to zero. Since *e* is a voltage due to ambient noise, it is extremely small. In addition, by means described hereinafter the susceptibility of the circuit to noise pulses can be made very low. The result is that even though random noise voltage is utilized in the operation of the invention, the detection of when $E=B$ can be made as precise as is warranted by the accuracy with which a bridge circuit having arms of equal impedance can be constructed.

Figure 3A:
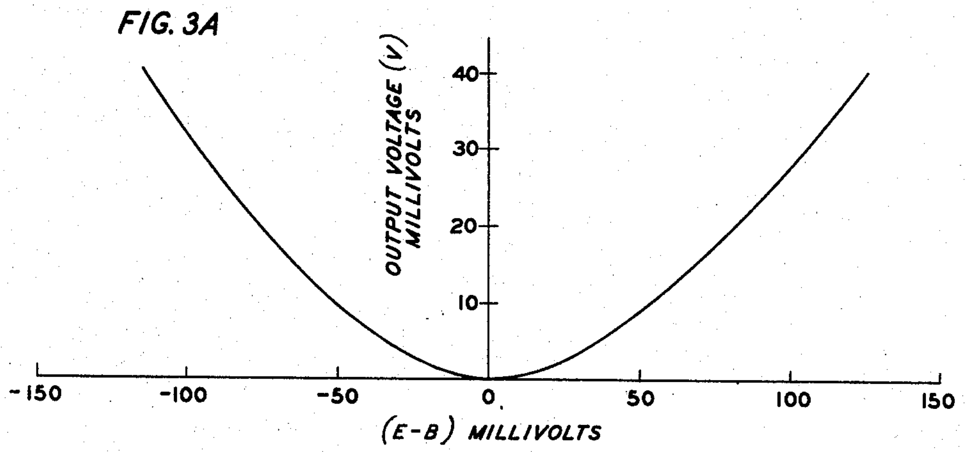
Figs. 3A, 3B and 3C are curves illustrating the transmission and transmission phase shift characteristics of the network of Fig. 2.
Figure 3B:
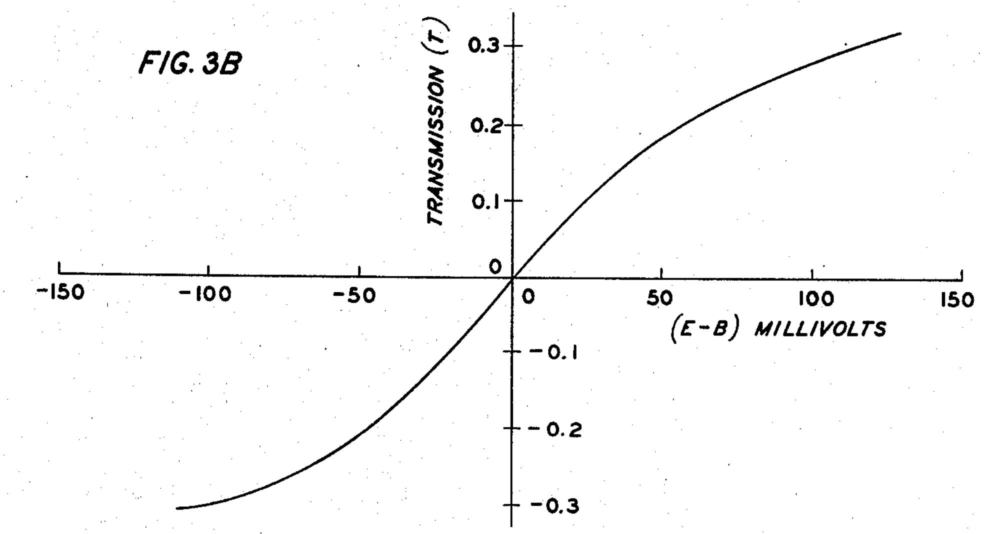
Figure 3C:
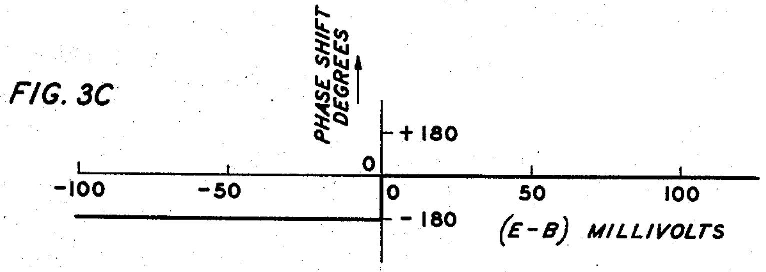

It shoud be noted that, although the amplitude of output voltage V changes with input voltage E in the vicinity of bridge balance, it does so only in a gradual and continuous manner. When contrasted with the abrupt reversal of bridge transmission phase shift, it becomes apparent that a circuit response to phase shift will be far more sensitive and accurate than one responsive to output voltage amplitude. This is evidenced by the curves in Figs. 3A, 3B, and 3C depicting the behavior of a typical crystal diode bridge network constructed as in Fig. 2. Curve 3A shows the relation between output voltage V and the net voltage $(E-B)$ applied to the bridge. From this the bridge circuit transmission characteristic (T) can be determined, being the ratio of the output voltage to the applied voltage for each value of the latter. The curve in Fig. 3B is a plot of an illustrative set of such experimental data, and shows that the transmission is zero when the applied voltage is zero and remains close to zero when the applied voltage is small regardless of its polarity. Accordingly, regenerative bridge voltage comparators which attempt to detect the change in bridge transmission at balance, as is characteristic of prior art circuits, encounter a fundamental obstacle to achievement of high sensitivity and accuracy. On the other hand, the curve in Fig. 3C shows that the transmission phase shift of the bridge undergoes an abrupt reversal (i.e., changes by 180 degrees) when the applied voltage reaches zero and the bridge passes through the condition of balance. Detection of this event, in accordance with the invention, can therefore be accomplished with great accuracy.

The curves of Fig. 3 were all drawn for the case wherein virtually no current flows through the bridge network. Actually, the transmission of such a bridge network is increased at all values of input voltage when a direct current load is connected across the bridge output terminals to permit direct current to flow in the bridge. This current reduces the resistance of the two diodes which are conducting, and so noticeably increases the output voltage which is produced in response to a small applied voltage. This effect is important when the bridge network is utilized in a feedback loop, since the increased transmission when the bridge is nearly balanced increases the sensitivity and speed of response of the loop.

Figure 4:
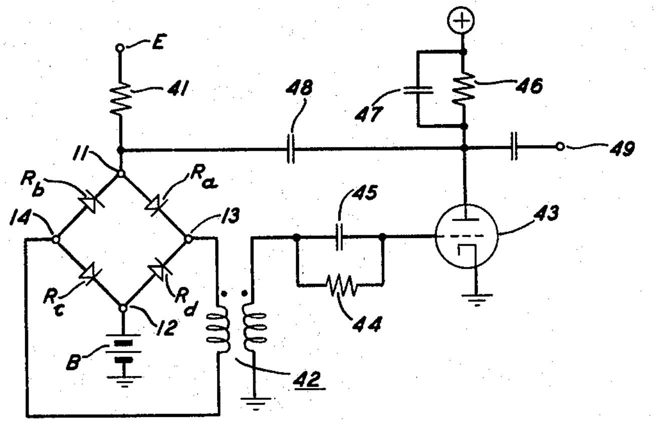

The diode bridge network of Fig. 2 may be utilized in an amplitude comparator constructed in accordance with the invention as shown in Fig. 4. A positive direct input voltage E relative to ground is applied through a resistor 41 to bridge input terminal 11. A positive bias voltage to ground is applied to terminal 12 by a source B. Bridge output terminal 13 is connected to the dotted terminal of the primary winding of a transformer 42, the other terminal of that winding being connected to bridge terminal 14. The dotted terminal of the secondary winding of transformer 42 is connected to the grid of a vacuum tube triode 43 by a resistor 44 shunted by a capacitor 45. The opposite terminal of the secondary winding of transformer 42, and the cathode of triode 43, are grounded. The anode of triode 43 is connected to the positive direct voltage supply by a resistor 46 shunted by a capacitor 47. The anode of triode 43 is also connected by a coupling capacitor 48 to bridge input terminal 11, and by another coupling capacitor to a circuit output terminal 49.

First suppose that input voltage E exceeds the bias voltage supplied by source B. Due to ambient electrical noise, random voltage pulses of very small amplitude are continually being produced between bridge terminals 11 and 12. If such a pulse is positive at input terminal 11, it will produce a voltage pulse across bridge terminals 13 and 14 which is positive at output terminal 13. The transmission phase shift through the bridge may, therefore, be considered zero degrees. This positive pulse is coupled to the secondary winding of transformer 42, resulting in a positive pulse relative to ground at the dotted terminal of that winding which is conveyed to the grid of triode 43 by capacitor 45. An amplified negative voltage pulse is thus produced at the anode and is conveyed via capacitor 48 back to bridge input terminal 11. However, since the initial noise pulse which resulted in this negative pulse was positive, the feedback loop extending from bridge input terminals 11 and 12 to bridge output terminals 13 and 14 through triode 43 and back to terminals 11 and 12 is degenerative. Consequently, the described pulses are only incipient in nature, being suppressed virtually as they are initiated. From this description it is apparent that a negative noise pulse at the bridge input terminals would result in feedback of a positive pulse to those terminals, and so would also be suppressed. The voltage of the anode of triode 43 thereby remains virtually constant, and the voltage at output terminal 49 remains zero.

If now input voltage E decreases, when it becomes infinitesimally less than bias voltage B the phase shift through the bridge network reverses. Then a noise pulse of negative polarity appearing at bridge input terminal 11 will result in a pulse of positive polarity at bridge output terminal 13. This pulse will be coupled by transformer 42 and capacitor 45 to the grid of triode 43, producing an amplified pulse of negative polarity which is fed back to bridge input terminal 11. Since this pulse has the same polarity as the pulse which initiated it, the feedback loop is regenerative and triode 43 is rapidly driven to saturation. A large amplitude pulse is thereby produced at output terminal 49. This process occurs so rapidly that the output pulse has a nearly vertical wavefront occurring virtually at the same instant as that at which input voltage E became equal to bias voltage B.

In Fig. 4 resistor 44 serves to limit the grid current of triode 43 after regeneration has occurred. Transformer 42 isolates the direct current flowing through the bridge network from triode 43, and capacitor 47 stabilizes the feedback loop against uncontrolled oscillation by limiting the width of the frequency band over which triode 43 has maximum gain to be somewhat less than the width of the frequency band over which transformer 42 provides efficient transmission between its primary and secondary windings. By preventing direct current transmission through the feedback loop itself the circuit achieves the advantages of freedom from the effects of interelectrode drift voltages and from the necessity for direct grid bias voltage supplies which characterize direct coupled amplifier circuits. That is, the circuit of Fig. 4 utilizes alternating current couplings in the feedback loop while still providing amplitude comparison of direct voltages. The function of input voltage E is solely to control the transmission phase shift through the bridge network, and does not itself directly contribute to the voltage which is regenerated in the feedback loop.

The characteristics of the circuit of Fig. 4 which are pertinent to its effectiveness as an amplitude comparator are its comparison delay, precision, accuracy, and sensitivity.

The comparison delay is the interval between occurrence of equality between input voltage E and bias voltage B and production of an output pulse at output terminal 49. This delay is made up of the sum of a detection delay and a signal generating delay. The former is the interval between occurrence of equality of voltages E and B and initiation of regeneration in the feedback loop, while the latter is the interval between initiation of regeneration in the loop and production of an output pulse at output terminal 49.

The minimum detection delay depends primarily on the switching time of the diodes in the bridge network, and for modern crystal diodes this time is extremely small, commonly of the order of a fraction of a microsecond.

The signal generating delay is proportional to the sum of the rise time of the regenerated signal, plus any transmission delay in reaching output terminal 49. The transmission delay is practically zero, and the regenerative rise time is inversely proportional to the frequency bandwidth of transmission through the loop. The loop bandwidth is mainly limited by the passband characteristic of transformer 42, but can be made very large by use of a high quality broad-band pulse transformer. Consequently, if required, the total comparison delay can be reduced to such a small value that an output pulse is produced at terminal 49 practically simultaneously with the instant at which signal voltage E reaches the level of the bias voltage B.

The precision of an amplitude comparator refers to its ability to discriminate between two voltages that are nearly equal. This is distinct from the concept of accuracy, which refers to how closely the measured results conform with reality. That mainly depends on whether the bias voltage B applied to the bridge network actually has the value assigned to it. Consequently, while high precision is necessary for high accuracy, it does not alone assure the latter. The precision of the circuit of Fig. 4 will increase as the gain provided by triode 43 is increased, up to a limit dependent on the degree to which the bridge network is balanced in the absence of any voltages applied thereto. Both the precision and accuracy therefore depend on the degree to which the resistances of the diodes in the bridge network are matched under open circuit conditions at a given temperature, and on the degree to which such a match is maintained over the operating range of temperature. One way of making the degree of required matching of the diodes less critical is to insert a resistor in series with each one, these resistors being matched in value and temperature coefficient and having a nominal value between the forward and reverse resistance of each diode.

The sensitivity of an amplitude comparator refers to its precision under noise-free condition. That is, the precision is limited by the amplitude of the noise pulses reaching the bridge network. Methods of reducing the effect of noise are discussed below. On the other hand, the sensitivity is the absolute minimum voltage difference to which the comparator will respond. It may, therefore, be regarded as the maximum attainable precision. The sensitivity improves as the detection delay of the comparator is increased, so that circuit operation can be improved by inserting a delay in the feedback loop as great as permissible from the standpoint of the maximum tolerable comparison delay.

Figure 5:
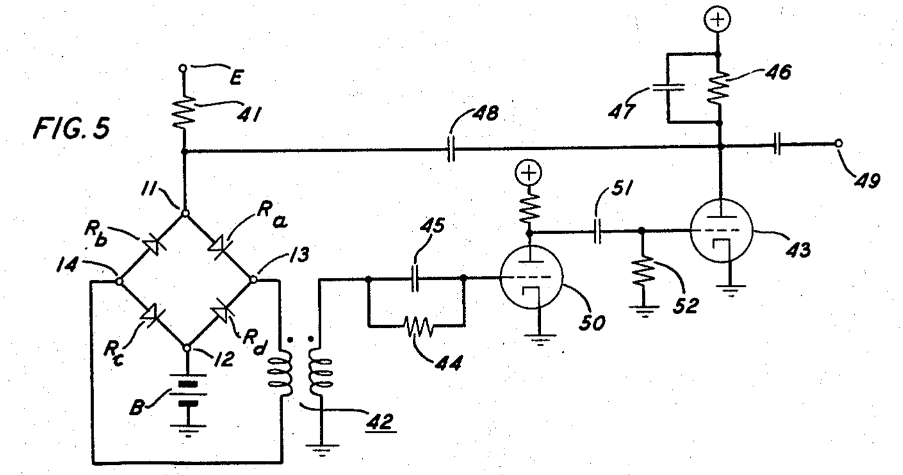

The circuit of Fig. 4 will detect when an input voltage E decreases to the level of bias voltage B. The circuit of Fig. 5 is similar, but is adapted to detect when an input voltage E increases to the level of bias voltage B. This is accomplished by the addition of a second vacuum tube triode 50 in the feedback loop. The parallel combination of resistor 44 and capacitor 45 is connected to the grid of triode 50 instead of to the grid of triode 43, the grid of the latter being connected by a capacitor 51 to the anode of triode 50. A resistor 52 connects the grid of triode 43 to ground. As a result of the additional gain contributed by triode 50, this circuit will have higher precision than that of Fig. 4.

With slight modification, the circuit of Fig. 5 can be adapted to detect when an input voltage E decreases to a fixed reference level B. An arrangement of this kind is shown in Fig. 6, wherein triode 43 is operated as a cathode follower having a cathode resistor 60. Capacitor 47 is here connected in shunt with the anode resistor of triode 50, and serves the same stabilization function as in Figs. 4 and 5. The output voltage of the circuit of Fig. 6 is obtained at the cathode of triode 43, from which point the feedback voltage to the bridge network is also derived. As a result, only one phase reversal is introduced into the feedback loop by triodes 43 and 50, instead of two reversals as in Fig. 5. Of course, any of the circuits of Figs. 4, 5 and 6 could be adapted to detect an opposite change in input voltage level relative to the bias voltage level by simply reversing the relative directions of the turns of the primary and secondary windings of transformer 42.

The embodiments of the invention in Figs. 4, 5 and 6 each involve both capacitive and transformer couplings in the feedback loop. In some cases it may be advantageous to utilize couplings of only a single type. For example, the amplitude comparator circuit in Fig. 7 is similar to that of Fig. 4 except that triode 43 is coupled to the bridge network only by capacitors, no transformer being required. Bridge output terminal 13 is connected by a coupling capacitor 70 to the grid of triode 43, bridge terminal 14 being connected by a coupling capacitor 71 to the cathode. A resistor 72 connects the grid to ground, the cathode also being grounded. To prevent the occurrence of a low shunting impedance across diode $R_C$, in this circuit source B should have a relatively large internal impedance. Since the frequency bandpass characteristic of capacitive couplings may be made much greater than that of transformer couplings, this circuit does not require any stabilizing capacitor shunting the anode resistor of triode 43 as in Fig. 4. That is, there is no danger of circuit instability before regeneration is initiated in the feedback loop by signal voltage E becoming equal to B. As explained above, the wider bandpass characteristic of the feedback loop results in a smaller comparison delay.

In the amplitude comparator circuit of Fig. 8 the feedback loop includes only transformer couplings. The bridge network, transformer 42 and triode 43 are the same as in Fig. 4. However, the grid of triode 43 is directly connected to the dotted terminal of transformer 42 without any capacitive coupling, and input voltage E is applied to bridge input 11 through the secondary winding **80*b* of a transformer 80 instead of through a resistor. In addition, a resistor 81 shunted by a bypass capacitor 82 is connected in series with the primary winding of transformer 42 between bridge terminals 13 and 14. The anode of triode 43 is directly connected to the grid of a triode 83, the cathode of which is grounded by a self-biasing circuit comprising a capacitor 84 and a resistor 85. The anode of triode 83 is connected to the positive direct voltage supply by the primary winding 80*a* of transformer 80. Transformer 80 has a tertiary winding 80*c*, of which one terminal is grounded and the other constitutes the output terminal 49** for the entire circuit.

The function of resistor 81 and capacitor 82 is to limit the direct current flowing in the bridge network while still providing a low impedance path for varying currents. With the winding polarities indicated for transformers 42 and 80 by the dots adjacent thereto, when input voltage E is greater than bias voltage B, the phase shift through the bridge being zero, a noise pulse at bridge input terminal 11 will result in a voltage pulse of the same polarity at the dotted terminals of the primary and secondary windings of transformer 42. By virtue of the phase inversion introduced by each of triodes 43 and 83, a pulse of the same polarity is produced at the dotted terminals of windings **80*a* and 80*b* of transformer 80, and so in a pulse of the same polarity being fed back to bridge input terminal 11. The feedback loop is therefore regenerative, and an output pulse is produced across tertiary winding 80*c* of transformer 80. If the relative directions of the turns of primary winding 80*a* and secondary winding 80*b* were reversed, the feedback loop would become regenerative when the amplitude of input voltage E became less than bias voltage B. Consequently, by providing transformer 80** with two oppositely wound primary windings and a simple double throw switch for selecting which of these windings is connected into the circuit, the amplitude comparator may be set at will to respond to either increasing or decreasing signal voltages.

By utilizing two amplitude comparators as described, each with its own bridge network and feedback loop, a two-way amplitude comparator may be constructed which will detect when an input voltage applied to both bridges rises above a first reference voltage and when it falls below a second reference voltage. In addition, by providing a bistable trigger circuit for interconnecting the two feedback loops, a "memory" characteristic can be attained whereby there will be a continuous indication of whether the last input voltage was of the increasing or decreasing type. The general features of a circuit of this kind are shown in the block diagram of Fig. 9.

Figure 9:
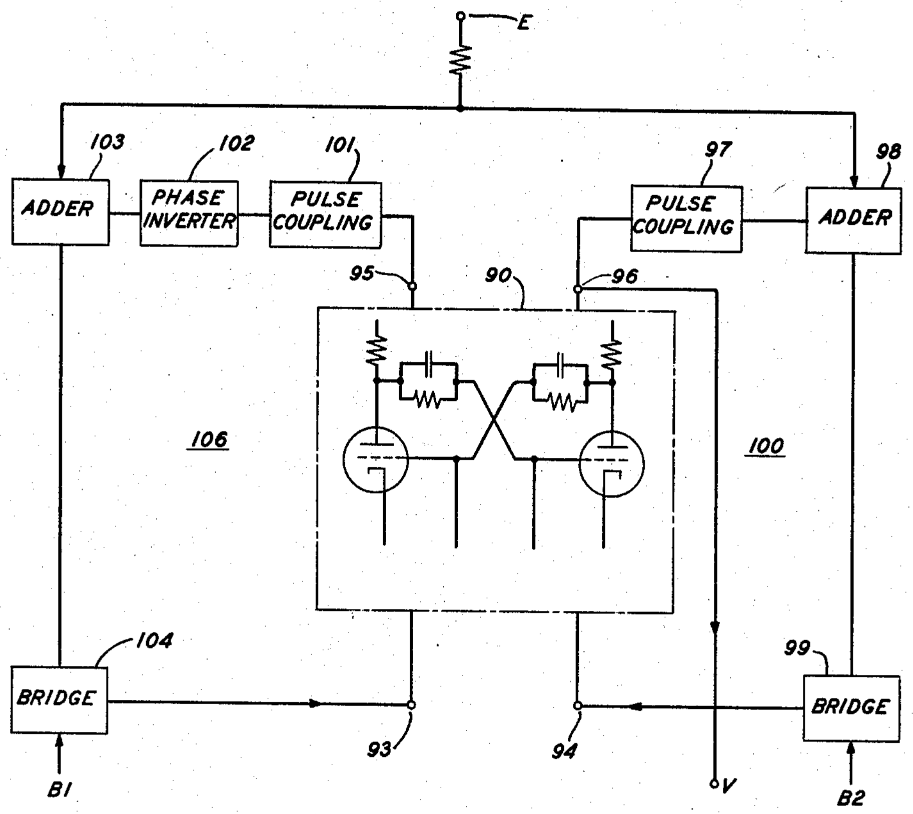
Fig. 9 is a block diagram of an amplitude comparator constructed in accordance with the invention which is adapted to detect both when an input voltage rises to a higher reference level and when it drops to a lower reference level.

Trigger circuit 90 is of the type which has two stable operating states between which it switches in response to applied pulses above a minimum threshold level. A great variety of such circuits are well known, the Eccles-Jordan trigger circuit comprising a pair of amplifiers having their anodes and grids cross-connected being perhaps the most common. Trigger circuits may be designed to respond to pulses of alternately opposite polarities or of only a single polarity, and may have either single or paired input and output terminals. In Fig. 9 trigger circuit 90 has been shown as having a pair of input terminals 93 and 94 and a pair of output terminals 95 and 96, and will be assumed to be designed to respond only to positive pulses. A positive pulse at input terminal 94 will raise the voltage at output terminal 96 to a maximum or "1" level and reduce that at terminal 95 to a minimum or "0" level. A positive pulse at input terminal 93 will interchange those output voltage levels. The state of the trigger circuit may be identified in terms of the voltage at its output terminal 96, which may also serve as the output voltage V of the entire circuit of Fig. 9. Accordingly, when output voltage V is at the "1" level trigger circuit 90 will be considered to be in the "1" state, while when output voltage V is at the "0" level trigger circuit 90 will be considered to be in the "0" state.

Trigger circuit output terminal 96 is connected to a pulse coupling circuit 97 which produces a positive voltage pulse when the voltage at terminal 96 increases. Each pulse produced by coupling circuit 97 is applied to a voltage adder 98 to which input voltage E is also applied. The sum produced by adder 98 is conveyed to the input terminal of a bridge network 99 the same as that described above with reference to Fig. 2 and which is biased by a direct voltage $B_2$. Pulses produced at the output terminal of bridge network 99 are applied to input terminal 94 of trigger circuit 90, thereby completing a feedback loop 100 wherein the trigger circuit serves as a pulse amplifier.

Trigger circuit output terminal 95 is connected to a pulse coupling circuit 101 which may be the same as pulse coupling circuit 97, and which in turn is connected to a phase inverter 102 which reverses the polarity of pulses applied thereto. Alternatively, coupling circuit 101 could be designed to produce a negative voltage pulse when the voltage at terminal 95 decreases, in which cases phase inverter 102 could be dispensed with. Each pulse produced by phase inverter 102 is applied to a voltage adder 103 the same as adder 98 and to which input voltage E is also applied. The resultant sum is applied to the input terminal of a bridge network 104 the same as bridge network 99 except that it is biased by a smaller direct bias voltage $B_1$. Pulses produced at the output terminal of bridge 104 are applied to input terminal 93 of trigger circuit 90, thereby completing a second feedback loop 106 wherein the trigger circuit serves as a pulse amplifier.

Either of feedback loops 100 or 106 will be regenerative when the total transmission phase shift therein around the entire loop is zero, and will be degenerative when that phase shift is −180 degrees. Considering feedback loop 100, the net transmission phase shift therein between the input and output of bridge 99 is zero. Consequently, for that loop to be regenerative the transmission phase shift through bridge 99 must be zero. On the other hand, in feedback loop 106 the net transmission phase shift between the input and output of bridge 104 is −180 degrees. For that loop to be regenerative the transmission phase shift through bridge 104 must therefore be −180 degrees. Considering input voltage E, when E is greater than bias voltage $B_2$, and so also greater than bias voltage $B_1$, the phase shift through both bridges is zero. Conversely, when E is less than bias voltage $B_1$, and so also less than bias voltage $B_2$, the phase shift through both bridges is −180 degrees. As a result, when E becomes greater than $B_2$, feedback loop 100 becomes regenerative and feedback loop 106 becomes degenerative. A positive noise pulse at the input of bridge 99 then causes trigger circuit 90 to assume the "1" state. Once in the "1" state, the circuit will remain quiescent, since even though feedback loop 100 may still be regenerative a negative noise pulse at the input of bridge 99 will result in a negative pulse at terminal 94 and so will be ineffective to cause trigger circuit 90 to reverse its state. When E becomes less than $B_1$, feedback loop 106 becomes regenerative and feedback loop 100 becomes degenerative. A negative noise pulse at the input of bridge 104 than causes trigger circuit 90 to assume the "0" state. Once in the "0" state, the circuit remains quiescent, since even though feedback loop 106 may still be regenerative a positive noise pulse at the input of bridge 104 will result in a negative pulse at terminal 93 and so will be ineffective to cause trigger circuit 90 to reverse its state. When E enters the range $B_1<E<B_2$, both loops remain in the condition which obtained just previously. This is because the transmission phase shift through each bridge then prevents initiation of regeneration in either feedback loop, and only such an event can cause trigger circuit 90 to change its state. The fact that a regenerative feedback loop may become degenerative only serves to prevent recirculation of pulses to the trigger circuit input terminal in that loop, while to produce a change of state of the trigger circuit requires application of a pulse above the threshold level to the trigger circuit input terminal in the degenerative loop. Such a pulse can only occur when that loop becomes regenerative.

Figure 10:
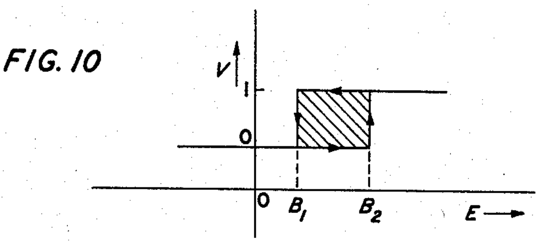
Fig. 10 is a graph relating the input voltage to the output voltage produced by the circuit of Fig. 9.

From the foregoing description it is apparent that when input voltage E is increasing, output voltage V will assume the "1" level at the instant E reaches the level of bias voltage $B_2$. When signal voltage E is descreasing, output voltage V will assume the "O" level at the instant E reaches the level of bias voltage $B_1$. This establishes a hysteresis characteristic as shown in Fig. 10, which is a graph of the level of output voltage V plotted against input voltage E. As E decreases from the value of bias voltage $B_2$ to that of $B_1$, output voltage V remains "1," while when E increases from $B_1$ to $B_2$, output voltage V remains "0." The width of the hysteresis region (shown shaded) can be reduced, with consequent increase in precision, accuracy and sensitivity, by making both feedback loops and both bias voltages as nearly identical as possible. That is, if $B_1$ and $B_2$ where precisely equal, and if the transmission characteristics of both feedback loops were identical, a single voltage comparison level would exist such that V would be "1" or "0" depending on whether E was above or below that comparison level. In actual practice such a zero hysteresis characteristic can be closely approached, but cannot be precisely attained due to drift between the bridge networks, variation in the gains of the triodes in the flip-flop circuit, and noise peaks in the various circuit supply voltages. The fact that the gain in each of the two feedback loops is finite is a further factor preventing attainment of zero hysteresis.

If bias voltage $B_1$ were made larger than $B_2$, the amplitude comparator would become unstable when E entered the range $B_2<E<B_1$. That is, when output voltage V reaches the "0" level it will necessarily revert to the "1" level because E exceeds $B_2$. However, as soon as V assumes the "1" level it will return to the "0" level because E is less than $B_1$. The circuit would therefore operate as an oscillator, the waveform of output voltage V being a cyclic series of rectangular pulses. The duration of the "1" and "0" pulses would depend on the value of E in the range between $B_1$ and $B_2$, since the transmission through each of bridges 99 and 103 increases with the amplitude of the net input voltage applied thereto. To a close approximation, the duration of each "1" output pulse would be linearly proportional to the ratio $$\frac{E-B_2}{B_1-B_2}$$

This permits the circuit of Fig. 9 to be used as a pulse width modulator responsive to input voltages within the range $B_2<E<B_1$. Even if this proportionality was not precisely linear, whenever the duration of a "1" output pulse exceeded that of the subsequent "0" output pulse, that would indicate that the value of E is closer to $B_1$ than to $B_2$. This suggests use of the circuit as a pulse regenerator for input voltages in the form of trains of binary pulses which have become distorted. Pulse amplitude distortion as great as 50 percent would still not prevent the waveform of output voltage V from being a replica of the undistorted pulse train.

A further application of the circuit of Fig. 9 may involve determination of the relationships between three variable voltages respectively corresponding to E, $B_1$ and $B_2$. Such a determination may be based on the fact that output voltage V is "0" if $E<B_1<B_2$ or if $E<B_2<B_1$; is is "1" if $B_1<B_2<E$ or if $B_2<B_1<E$; and is a succession of pulses if $B_2<E<B_1$.

Figure 11:
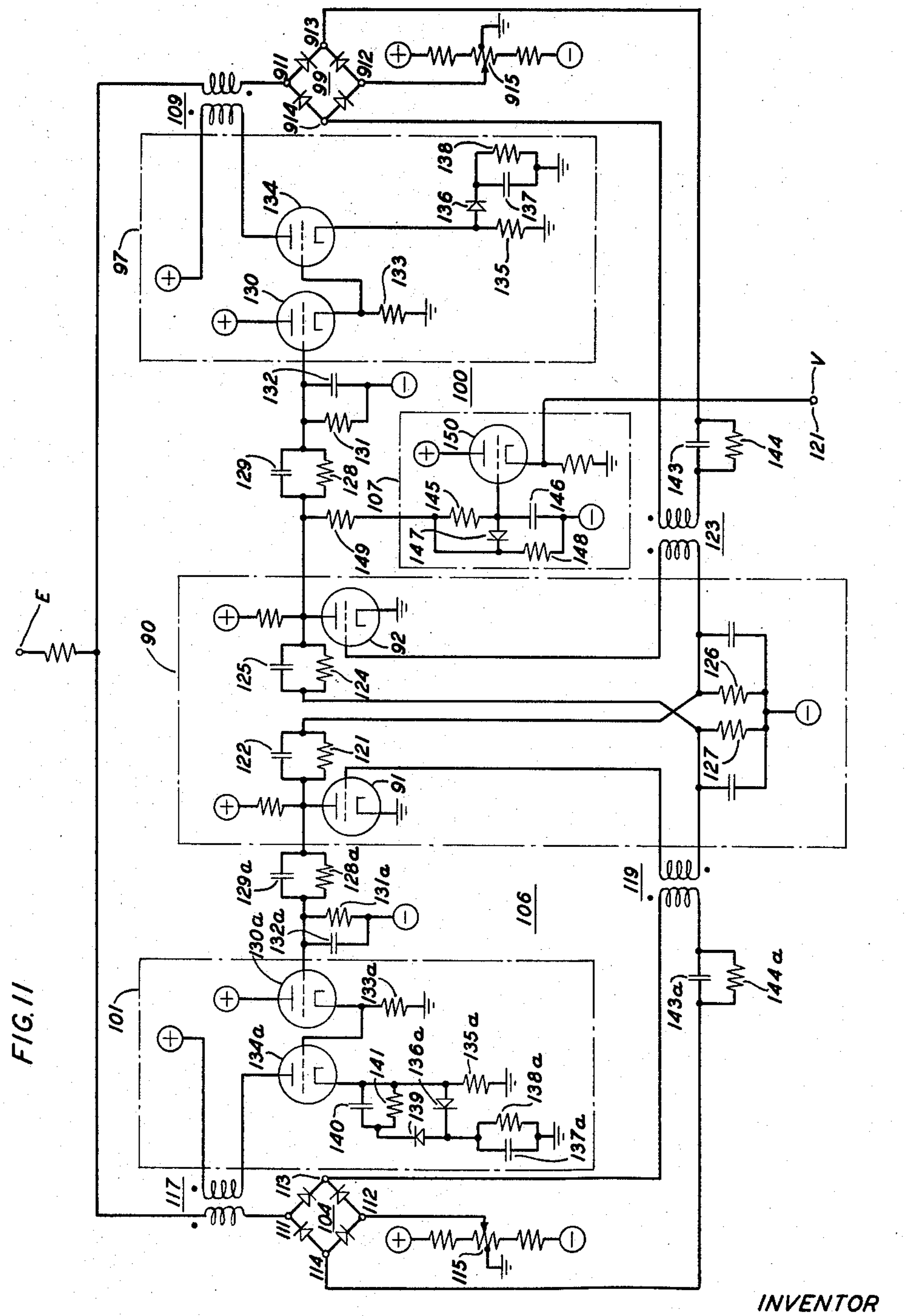
Fig. 11 is a circuit diagram of an amplitude comparator constructed in accordance with the block diagram of Fig. 9.

A specific circuit constructed in accordance with the block diagram of Fig. 9 is shown in Fig. 11. Trigger circuit 90 and pulse coupling circuits 97 and 101 are respectively shown within dotted blocks. The circuit within dotted block 107 is a voltage threshold integrator for preventing spurious output voltages due to isolated noise pulses, as described in more detail below. The function of adder 98 of Fig. 9 is performed by a transformer 109, while the functions of phase inverter 102 and adder 103 are performed by a transformer 117. Input voltage E is applied both to input terminal 911 of bridge 99 and input terminal 111 of bridge 104, each of bridges 99 and 104 being identical with the bridge network described above with reference to Fig. 2. Terminal 912 of bridge 99 is connected to the arm of a potentiometer 915 which has a grounded center-tap and which is connected between equal positive and negative direct supply voltages. The position of the potentiometer arm thereby establishes bias voltage $B_2$ for bridge 99, and may be either positive or negative depending whether the arm is above or below the center-tap. Terminal 112 of bridge 104 is connected to the arm of a similarly connected potentiometer 115, so that the position of the potentiometer arm establishes bias voltage $B_1$ for bridge 104. As explained previously, if the circuit is to be used as an amplitude comparator, $B_2$ should exceed $B_1$ by some amount, however small. The output voltage V produced by the circuit appears at terminal 121 and is at either a "1" level or a lower "0" level.

Trigger circuit 90 comprises a pair of triodes 91 and 92. The anode of triode 91 is connected to one terminal of the parallel combination of a resistor 121 and capacitor 122, the other terminal of which is connected by the secondary winding of a transformer 123 to the grid of triode 92 and by a resistor 126 to the negative direct supply voltage. The anode of triode 92 is connected to one terminal of the parallel combination of a resistor 124 and capacitor 125, the other terminal of which is connected by the secondary winding of transformer 119 to the grid of triode 91 and by a resistor 127 to the negative direct supply voltage. Resistors 126 and 127 are respectively shunted by small pulse coupling capacitors. The cathode of each triode is grounded, and the anode of each is connected by a resistor to the positive direct supply voltage. The triode which is conducting, or "on," will have a very low anode voltage. As a result, the grid of the other "off" triode will be biased strongly negatively by the negative direct supply voltage. The anode voltage of the "off" triode will be almost equal to the positive supply voltage, so that the grid of the "on" triode is only slightly negatively biased. Consequently, a small negative pulse at the grid of the "on" triode will be effective to cause the trigger circuit to change state, while a small positive pulse at the grid of the "off" triode has no effect. In other words, the threshold level for a positive triggering voltage is much lower than the threshold level for a negative triggering voltage.

The anode of triode 92 is connected by a resistor 128 shunted by a small pulse coupling capacitor 129 to the grid of a triode 130 serving as a cathode follower in pulse coupling circuit 97. A resistor 131 shunted by a small coupling capacitor 132 connects the grid of triode 130 to the negative direct supply voltage. Resistors 128 and 131 serve as a voltage divider, whereby a fraction of the positive pulse produced at the anode of triode 92 when it is turned "off" is conveyed to the grid of triode 130. The capacitors shunting these resistors prevent degradation of the leading edge of such a pulse due to stray capacitances to ground. The cathode of triode 130 is connected to ground by a resistor 133, the anode being connected to the positive direct voltage supply. The cathode is also connected to the grid of another triode 134, the anode of which is connected by the primary winding of transformer 109 to the positive supply voltage. The cathode of triode 134 is connected to ground by a resistor 135, and is further connected to the anode of a diode 136. The cathode of diode 136 is connected to ground by a capacitor 137 and resistor 138 in parallel.

When triode 92 is turned "off," the positive pulse at its anode results in a positive pulse at the cathode of triode 130 and so in application of a positive pulse to the grid of triode 134. The voltage at the cathode of the latter triode therefore rises, and current flows through diode 136 to charge capacitor 137. However, since capacitor 137 cannot charge instantaneously the rate of rise of the voltage at the cathode of triode 134 is less than that at the grid. The grid voltage thereby overtakes and then considerably exceeds the cathode voltage, and a very large anode current results. This develops a voltage pulse across the primary winding of transformer 109 which is positive at the dotted terminal. When triode 92 is turned "on," thereby applying a negative pulse to the grid of triode 134, the cathode voltage of the latter tends to drop. Due to the charge trapped on capacitor 137, diode 136 becomes nonconductive and so isolates capacitor 137 from the cathode. The cathode voltage can therefore drop across resistor 135, following the grid voltage. As a result, very little change occurs in the anode current and no voltage pulse is produced across the primary winding of transformer 109. Capacitor 137 begins to discharge through resistor 138 when diode 136 becomes nonconductive, but the time constant of this discharge path is sufficient so that the voltage across capacitor 137 maintains diode 136 nonconductive until trigger circuit 90 has reached stability in the "0" state. This prevents transient pulses which may occur in feedback loop 100 from returning trigger circuit 90 to the "1" state immediately after it switches to the "0" state. The polarization of pulse coupling circuit 97 to produce an output pulse only in response to a positive applied pulse thereby achieves a high degree of circuit stability.

In feedback loop 106 polarized pulse coupling circuit 101 and the elements connecting it to the anode of triode 91 are substantially identical with pulse coupling means circuit 97 and the elements connecting it to the anode of triode 92 in feedback loop 100. Accordingly, corresponding elements of both couplings and connections have been identified in Fig. 11 with the same reference numerals but with a suffix "*a*" for those in feedback loop 106. The only difference between coupling circuits 97 and 101 is that in the latter the cathode of diode **136*a* is connected to the anode of a diode 139, the cathode of which is connected to the cathode of triode 134*a* by a capacitor 140 and resistor 141 in parallel. The function of these additional elements is to speed up the rate at which capacitor 137*a* discharges when triode 91 is turned "on," thereby permitting the amplitude comparator to respond to more rapid fluctuations of input voltage E. That is, suppose that E suddenly becomes greater than bias voltage $B_2$, causing trigger circuit 90 to assume the "1" state with triode 91 "on." Capacitor 137*a* will then begin discharging. Also suppose that E then almost immediately again becomes less than bias voltage $B_1$. If capacitor 137*a* were still nearly fully charged the positive pulse then applied to the grid of triode 134*a* would not immediately cause diode 136*a* to conduct. This would delay the production of a pulse in transformer 117, and so delay transfer of trigger circuit 90 to the "0" state. However, as soon as the trigger circuit assumes the "1" state, capacitor 137*a* can discharge through diode 139 and the parallel combination of capacitor 140 and resistor 141 as well as through resistor 138***a*. Capacitor 140 and resistor 141 establish a sufficient discharge time constant to prevent capacitor 137*a* from discharging so rapidly as to permit spurious operation due to transients during a short interval immediately following assumption of the "1" state by the trigger circuit. When the trigger circuit returns to the "0" state the positive voltage then produced at the cathode of triode 134*a* renders diode 139 nonconductive, so that neither it nor capacitor 140 and resistor 141 then have any effect on the operation of pulse coupling circuit 101.

When a positive pulse is produced at the dotted terminal of the primary winding of transformer 109, it will result in a positive pulse at input terminal 911 of bridge 99, the latter terminal being connected to the dotted terminal of the secondary winding of transformer 109. Assuming that E exceeds bias voltage $B_2$, the transmission phase shift through bridge 99 being zero, a positive pulse will be produced at bridge output terminal 913 (i.e., terminal 913 is pulsed positively relative to terminal 914). Terminal 913 is connected to the undotted terminal of the primary winding of a transformer 123 by a capacitor 143 shunted by a resistor 144. Bridge terminal 914 is connected to the dotted terminal of the same transformer winding. As a result, the positive pulse at bridge output terminal 913 causes the dotted terminal of the primary winding of transformer 123 to be pulsed negatively relative to the dotted terminal. Since the dotted terminal of the secondary winding of transformer 123 is connected to the grid of triode 92 in trigger circuit 90, that grid is subjected to a negative pulse which assists in transferring trigger circuit 90 to the "1" state. A positive pulse is thereby produced at the anode of triode 92, and so also at the dotted terminal of the primary winding of transformer 109. Feedback loop 100 thus is regenerative when E exceeds bias voltage $B_2$, and causes trigger circuit 90 to assume the "1" state.

When a positive pulse is produced at the dotted terminal of the primary winding of transformer 117, it will result in a negative pulse at input terminal 111 of bridge 104 since the latter terminal is connected to the undotted terminal of the secondary winding of transformer 117. In this way transformer 117 performs the phase inversion function described above with reference to phase inverter 102 of Fig. 9. Assuming that E is less than the bias voltage $B_1$, the transmission phase shift through bridge 104 being −180 degrees, a positive pulse will be produced at bridge output terminal 113 (i.e., terminal 113 is pulsed positively relative to terminal 114). Terminal 113 is connected to the dotted terminal of the primary winding of a transformer 119, the undotted terminal being connected to bridge terminal 114 by capacitor 143*a* shunted by resistor 114*a*. Consequently, the dotted transformer terminals are pulsed positively relative to the undotted terminals. Since it is the undotted terminal of the secondary winding of transformer 119 which is connected to the grid of triode 91 in trigger circuit 90, that grid is subjected to a negative pulse which assists in transferring the trigger circuit to the "0" state. A positive pulse is thereby produced at the anode of triode 91, and so also at the dotted terminal of the primary winding of transformer 117. Feedback loop 106 thus is regenerative when E is less than bias voltage $B_1$, and causes trigger circuit 90 to assume the "0" state.

Threshold integrator 107 is interposed between the anode of triode 92 in trigger circuit 90 and output terminal 121 to provide a degree of immunity from isolated noise pulses having amplitudes above the ambient electronic noise level. Noise pulses within the ambient level serve to initiate a change of state of trigger circuit 90 when input voltage E rises to the level of bias voltage $B_1$ or falls below the level of bias voltage $B_2$. However, when E lies within the range between bias voltages $B_1$ and $B_2$, noise pulses should be ineffective to cause such a change of state. Ambient electronic noise, or so-called "white noise," is of relatively constant amplitude. It can, therefore, be readily compensated by slightly adjusting the values of voltages $B_1$ and $B_2$. Due to supply voltage transients and various other external disturbances, isolated noise pulses above the ambient level may also occur. Suppose that $E<B_2$, output voltage V being "0," and that such an isolated noise pulse occurs of sufficient amplitude to cause the net voltage across the input terminals of bridge 99 become momentarily greater than $B_1$. Then trigger circuit 90 will momentarily assume the "1" state. After the noise pulse ends the trigger circuit will revert to the "0" state. Threshold integrator 107 serves to prevent output voltage V from departing from the "0" value during such a chain of events.

The threshold integrator circuit comprises a resistor 145 and capacitor 146 connected in series with a resistor 149 between the anode of triode 92 and the source of negative direct supply voltage. The junction of resistor 145 and capacitor 146 is connected to the anode of a diode 147, the cathode of which is connected to the other terminal of resistor 145 and is further connected by a resistor 148 to the other terminal of capacitor 146. The anode of diode 147 is further connected to the grid of a triode 150, the cathode of which is connected to ground by a resistor 151. The voltage across this resistor constitutes the output voltage V, output terminal 121 being connected to the cathode of triode 150. When trigger circuit 90 is in the "0" state the voltage at the anode of triode 92 is relatively low. The net negative voltage applied to the grid of triode 150 via resistors 149, 145 and 148 is then below the grid cutoff voltage and triode 150 is not conductive. Output voltage V is then zero. If the trigger circuit should change to the "1" state, the positive pulse produced at the anode of triode 92 will cause capacitor 146 to begin to charge, thereby making the voltage at the grid of triode 150 less negative. The charging circuit includes resistors 145 and 149, so that by adjusting the magnitudes of those resistors, as well as of capacitor 146, the minimum interval required to raise the grid voltage of triode 150 above the cutoff level can be set to a predetermined value somewhat greater than the duration of the longest isolated noise pulse which is anticipated. If trigger circuit 90 returns to the "0" state before expiration of that interval, triode 150 remains nonconductive and output voltage V remains zero. However, if the trigger circuit remains in the "1" state longer than the predetermined minimum interval referred to, as will be true if input voltage E becomes greater than bias voltage $B_2$, capacitor 146 will charge sufficiently to raise the voltage of the grid of triode 150 beyond cutoff and that tube becomes conductive. Output voltage V then suddenly rises to the "1" level, and remains there due to the continued conduction of triode 150. The function of diode 147 and resistor 148 is to provide a path whereby capacitor 146 can discharge more rapidly than it charges, so that after that capacitor has been charged as a result of a noise pulse the charge thereon will rapidly dissipate after the noise pulse terminates. This reduces the minimum spacing of successive isolated noise pulses that can be rejected.

Of course, as a result of this noise immunizing arrangement, a constant delay is introduced into the determination of the amplitude of input voltage E. This affects the comparison delay, as defined above, but not the precision, accuracy or sensitivity of the measurement. Since the threshold integrator can be adjusted so the delay it introduces is less than the shortest interval between successive variations of a given input voltage between values less than $B_1$ and greater than $B_2$, for most applications the advantages it provides will outweigh the delay it introduces. If this is not true in a particular case, the effect of the threshold integrator can be rendered nil by simply open-circuiting capacitor 146.

Capacitors 143 and 143a and their shunting resistors 144 and 144a serve a number of functions. These resistors protect the diodes in bridges 99 and 104 against excessive current when input voltage E becomes abnormally large. The capacitors provide low impedance couplings between the primary windings of transformers 119 and 123 and the corresponding bridges when regeneration is initiated in either of feedback loops 100 and 106. In addition, in the event that regularly recurring noise pulses are present, as contrasted with isolated noise pulses of the kind referred to above, these capacitors will charge to the peak noise voltage and so prevent the pulses from affecting the feedback loops. Finally, the delay which each of these parallel resistor-capacitor combinations introduce into their respective feedback loops makes it possible to achieve increased precision, accuracy and sensitivity at the expense of a small increase in the detection delay, as defined above. This result follows from a consideration of the Heisenberg Uncertainty Principle as applied to the mode of operation of the circuit involved in applicant's invention. Such consideration leads to the conclusion that the minimum change in voltage which can be detected is inversely proportional to the detection delay. Of course, if maximum operating speed should be required even at the expense of some sensitivity and noise immunity, capacitors 143 and 143a and resistors 144 and 144a can be omitted.

It is apparent that many variations of the specific circuitry described herein may be devised without departing from the teachings and scope of applicant's invention. One obvious modification, which is inherent in the description of the mode of operation of the circuits of Figs. 9 and 10, would be to polarize pulse coupling circuit means 101 to respond only to negative pulses, producing negative pulses in response thereto. Then phase inverter 102 could be eliminated and pulse coupling circuits 97 and 101 could both be connected to trigger circuit output terminal 96. The amplitude comparator would then still operate as described. Another possibility would be to polarize pulse coupling circuit 101 to respond to only negative pulses and to produce only positive pulses, and to design trigger circuit 90 to change state in response to a negative pulse at input terminal 93. Then a single input terminal to the trigger circuit would suffice so long as the connections between such a terminal and the two bridges prevented direct interaction between the bridges. It is therefore intended that the invention be recognized as being limited only by the ensuing claims rather than by what are essentially details of circuit construction.

What is claimed is:

1. An amplitude comparator for comparing the amplitude of an input voltage with each of two reference voltages, comprising a pair of bridge networks each of which has an input terminal and an output terminal, means for applying said input voltage to the input terminal of each of said bridge networks, means for biasing a first of said bridge networks with a first of said reference voltages and the second of said bridge networks with the second of said reference voltages, each of said bridge networks having a transmission phase shift between its input and output terminals which changes discontinuously from a first to a second value when said input voltage changes from an amplitude within the level of the reference voltage biasing that bridge network to an amplitude beyond that level, a pair of amplifiers each of which has an input terminal and an output terminal, first coupling means for respectively connecting the input and output terminals of said first bridge network to the output and input terminals of a first of said amplifiers to form a first feedback loop, and second coupling means for respectively connecting the input and output terminals of said second bridge network to the output and input terminals of said second amplifier to form a second feedback loop, the transmission phase shift through said first bridge network rendering said first feedback loop regenerative only when that phase shift is at said first value, and the transmission phase shift through said second bridge network rendering said second feedback loop regenerative only when that phase shift is at said second value.

2. The amplitude comparator of claim 1, wherein each of said amplifiers assumes a first operating condition when the feedback loop in which it is connected becomes regenerative, and further comprising means for so interconnecting said amplifiers that when either assumes its first operating condition the other amplifier is caused to assume a second operating condition.

3. The amplitude comparator of claim 2, where said two coupling means are each adapted to produce an output voltage only when the amplifier connected thereto changes from a selected one of its operating conditions to the other of its operating conditions.

4. The amplitude comparator of claim 1, and further comprising means for so interconnecting said amplifiers that either amplifier assumes a first operating condition when a voltage pulse exceeding a positive threshold is applied to its input terminal and assumes a second operating condition when a voltage pulse exceeding a negative threshold is applied to its input terminal, and biasing means connected to each of said amplifiers for establishing the voltage pulse threshold of one polarity at a larger value than the voltage pulse threshold of the opposite polarity.

5. An amplitude comparator for comparing the amplitude of an input voltage with each of two reference voltages, comprising a pair of bridge networks each of which has an input terminal and an output terminal, means for applying said input voltage to the input terminal of each of said bridge networks, means for biasing the first of said bridge networks with the first of said reference voltages and the second of said bridge networks with the second of said reference voltages, each of said bridge networks being adapted to produce a transmission phase shift between its input and output terminals which changes discontinuously from a first to a second value when said input voltage changes from an amplitude within the level of the reference voltage biasing that bridge network to an amplitude beyond that level, a trigger circuit having two stable operating states between which it switches in response to pulses applied thereto, first coupling means for connecting said trigger circuit in a first feedback loop extending from the output terminal back to the input terminal of said first bridge network, and second coupling means for connecting said trigger circuit in a second feedback loop extending from the output terminal back to the input terminal of said second bridge network, said trigger circuit being adapted to switch to one of its operating states when said first feedback loop becomes regenerative and to switch to the other of its operating states when said second feedback loop becomes regenerative, the transmission phase shift introduced into said first feedback loop by said first bridge network rendering that loop regenerative only when that phase shift is at said first value, and the transmission phase shift introduced into said second feedback loop by said second bridge network rendering that loop regenerative only when that phase shift is at said second value.

6. An amplitude comparator for comparing the amplitude of an input voltage with each of two reference voltages, comprising a pair of bridge networks each of which has an input terminal and an output terminal, means for applying said input voltage to the input terminal of each of said bridge networks, means for biasing the first of said bridge networks with the first of said reference voltages and the second of said bridge networks with the second of said reference voltages, each of said bridge networks being adapted to produce a transmission phase shift between its input and output terminals which changes discontinuously from a first to a second value when said input voltage changes from an amplitude within the level of the reference voltage biasing that bridge network to an amplitude beyond that level, a pair of pulse amplifying means, first coupling means for connecting one of said pulse amplifying means in a first feedback loop extending from the output terminal back to the input terminal of said first bridge network, second coupling means for connecting the second of said pulse amplifying means in a second feedback loop extending from the output terminal back to the input terminal of said second bridge network, a trigger circuit having two stable operating states between which it switches in response to pulses applied thereto, means for connecting said trigger circuit to each of said feedback loops, said trigger circuit being adapted to switch to one of its operating states when said first feedback loop becomes regenerative and to switch to the other of its operating states when said second feedback loop becomes regenerative, the transmission phase shift introduced by said first bridge network into said first feedback loop rendering that loop regenerative only when that phase shift is at said first value, and the transmission phase shift introduced by said second bridge network into said second feedback loop rendering that loop regenerative only when that phase shift is at said second value.

7. An amplitude comparator for comparing the amplitude of an input voltage with each of two reference voltages, comprising a pair of amplifiers each of which has a control terminal and an output terminal, means for interconnecting said amplifiers to form a trigger circuit wherein in response to application of a threshold voltage of prededetermined polarity to the control terminal of either of said amplifiers that amplifier changes from the first to the second of two stable operating states and the other amplifier changes from the second to the first of the same two stable operating states, a pair of bridge networks each of which has an input terminal and an output terminal, means for applying said input voltage to the input terminal of each of said bridge networks, means for biasing a first of said bridge networks with a first of said reference voltages and the second of said bridge networks with the second of said reference voltages, each of said bridge networks being adapted to produce a transmission phase shift between its input and output terminals which changes from a forward to a reverse value when the amplitude of said input voltage passes through the level of the reference voltage biasing that bridge network, first coupling means for respectively connecting the input and output terminals of said first bridge network with the output and control terminals of the first of said amplifiers to form a first feedback loop, said first coupling means having a transmission phase shift which renders said first feedback loop regenerative when the transmission phase shift of said first bridge network is at said forward value and degenerative when the transmission phase shift of said first bridge network is at said reverse value, and second coupling means for respectively connecting the input and output terminals of said second bridge network with the output and control terminals of the second of said amplifiers to form a second feedback loop, said second coupling means having a transmission phase shift which renders said second feedback loop regenerative when the transmission phase shift of said second bridge network is at said reverse value and degenerative when the transmission phase shift of said second bridge network is at said forward value.

8. An amplitude comparator for comparing the amplitude of an input voltage with each of two reference voltages, comprising bistable means adapted to switch between two stable operating states in response to voltage pulses applied thereto exceeding a minimum threshold, a first output voltage pulse being produced by said bistable means each time it switches from said first to said second operating state and a second output voltage pulse being produced each time it switches from said second to said first operating state, a pair of impedance bridge networks each of which has an input terminal and an output terminal, means for applying said input voltage to the input terminal of each of said bridge networks, means for biasing a first of said bridge networks with a first of said reference voltages and the second of said bridge networks with the second of said reference voltages, each of said bridge networks being adapted to produce a transmission phase shift between its input and output terminals which changes discontinuously from a first to a second value when said input voltage changes from an amplitude within the level of the reference voltage biasing that bridge network to an amplitude beyond that level, first coupling means for connecting said bistable means between the input and output terminals of said first bridge network to form a first feedback loop, said first coupling means being polarized to transmit only said first output pulse produced by said bistable means, and second coupling means for connecting said bistable means between the input and output terminals of said second bridge network to form a second feedback loop, said second coupling means being polarized to transmit only said second output pulse produced by said bistable means, said first coupling means having a transmission phase shift such that said first feedback loop is regenerative only when the transmission phase shift of said first bridge network is at said first value, and said second coupling means having a transmission phase shift such that said second feedback loop is only regenerative when the transmission phase shift of said second bridge network is at said second value.

9. An amplitude comparator for comparing the amplitude of an input voltage with each of two reference voltages, comprising a pair of amplifiers each of which has a control terminal and an output terminal, means for interconnecting said amplifiers to form a trigger circuit wherein in response to application of a threshold voltage of predetermined polarity to the control terminal of either of said amplifiers that amplifier changes from a first to the second of two stable operating states and the other amplifier changes from the second to the first of the same two stable operating states, a pair of full wave rectifier bridges each of which has a pair of alternating current terminals and a pair of direct current terminals, means for applying said input voltage to an alternating current terminal of each of said bridges, means for respectively applying said reference voltages to the remaining alternating current terminals of said bridges, first coupling means for respectively connecting the control and output terminals of a first of said amplifiers to one of the direct and one of the alternating current terminals of said first bridge to form a first feedback loop, said first coupling means being polarized to permit only positive pulses to recirculate in said first feedback loop and having a transmission phase shift such that said first feedback loop is only regenerative when the amplitude of said input voltage is beyond the level of the reference voltage applied to said first bridge, and second coupling means for respectively connecting the control and output terminals of the second of said amplifiers to one of the direct and one of the alternating current terminals of said second bridge to form a second feedback loop, said second coupling means being polarized to permit only negative pulses to recirculate in said second feedback loop and having a transmission phase shift such that said second feedback loop is only regenerative when the amplitude of said input voltage is beyond the level of the reference voltage applied to said second bridge.

References Cited in the file of this patent

UNITED STATES PATENTS

| | | |
|---|---|---|
| 2,598,996 | Harrison | June 3, 1952 |
| 2,715,718 | Holtje | Aug. 16, 1955 |
| 2,883,608 | Smith | Apr. 21, 1959 |